(12) United States Patent
Kim

(10) Patent No.: US 7,367,288 B2
(45) Date of Patent: May 6, 2008

(54) UPPER BUNDLE CLEANING SYSTEM OF STEAM GENERATOR

(75) Inventor: Kyung-sub Kim, Suwon (KR)

(73) Assignee: Korea Plant Service & Engineering Co., Ltd.

( * ) Notice: Subject to any disclaimer, the term of this patent is extended or adjusted under 35 U.S.C. 154(b) by 17 days.

(21) Appl. No.: 11/555,538

(22) Filed: Nov. 1, 2006

(65) Prior Publication Data

US 2008/0053382 A1    Mar. 6, 2008

(30) Foreign Application Priority Data

Aug. 14, 2006   (KR) ..................... 10-2006-0076847

(51) Int. Cl.
*F28G 1/00*   (2006.01)
*F28G 15/00*  (2006.01)

(52) U.S. Cl. ................. 122/379; 122/392; 122/382; 122/390; 134/166 R; 134/167 R; 134/168 R

(58) Field of Classification Search ............... 122/379, 122/390, 391, 392, 405; 432/75
See application file for complete search history.

(56) References Cited

U.S. PATENT DOCUMENTS

| | | | | |
|---|---|---|---|---|
| 5,069,172 A | * | 12/1991 | Shirey et al. | 122/392 |
| 5,913,320 A | * | 6/1999 | Varrin et al. | 122/392 |
| 6,145,583 A | * | 11/2000 | Gay et al. | 122/392 |
| 6,513,462 B1 | * | 2/2003 | Shiraishi et al. | 122/390 |
| 6,820,575 B2 | * | 11/2004 | Ashton et al. | 122/379 |
| 2005/0235927 A1 | * | 10/2005 | Hwang et al. | 122/379 |

* cited by examiner

*Primary Examiner*—Kenneth Bomberg
*Assistant Examiner*—Andrew M Juettner
(74) *Attorney, Agent, or Firm*—Sheridan Ross P.C.

(57) ABSTRACT

An upper bundle cleaning system of steam generator is disclosed which can clean heat transfer tubes and a plurality of tube support plates that support the heat transfer tubes and have slots, using a cleaning device transferred along a guide rail installed to an upper hand hole of the steam generator. The cleaning device is installed to an ascending/descending mechanism which is vertically transferable. The cleaning device includes a frame, at least one or more guide component, a spray component, and a hinge unit, such that the cleaning device is ascended and descended by the ascending/descending mechanism to clean the heat transfer tubes and the tube support plates.

11 Claims, 15 Drawing Sheets

UPPER BUNDLE CLEANING SYSTEM OF STEAM GENERATOR

BACKGROUND OF THE INVENTION

1. Field of the Invention

The present invention relates to a cleaning system of a steam generator and, more particularly, to a cleaning system which is capable of cleaning the heat transfer tubes and a plurality of tube support plates supporting the heat transfer tubes, which are installed to the inside of a steam generator, using a cleaning device transferred along a guide rail installed to an upper hand hole of the steam generator, in which the cleaning device is installed to an ascending/descending means which is vertically transferable, such that the plurality of tube support plates and the upper bundle of the heat transfer tubes can be cleaned.

2. Description of the Related Art

The steam generators, specially which are Westinghouse F-Models, are presently installed in Gori nuclear power plant, Units 2, 3, and 4 and Young Gwang nuclear power plant, Units 1 and 2, in the Republic of Korea. The steam generator serves to generate steam to drive a turbine generator by heat exchange. More specifically, as radioactive water containing heat energy generated in a reactor flows in thousands of heat transfer tubes in a high temperature and high pressure state, and transfers its heat energy to the non-radioactive water flowing outside the heat transfer tubes, the non-radioactive water is changed into steam.

On the other hand, when the steam generator is operated in a state where the heat transfer tubes are damaged, the radioactive water flowing in the heat transfer tubes leaks and mixes with the non-radioactive water. Then, the steam converted from the non-radioactive water contaminated by the radioactive water causes radioactive pollution in the steam receiving areas. Because of this, it is important to secure the integrity of the heat transfer tubes so as not to cause such radioactive pollution.

The steam generator is configured such that: thousands of heat transfer tubes, which are U shaped, i.e., U-tubes, are formed as a bundle, which is called a tube bundle; both ends of each U-tube are fixed to a tube sheet located at the lowest part of the tube bundle; and the heat transfer tubes are supported by tube support plates at seven stages which are spaced every about 1 m from the bottom to the top. However, the conventional steam generator is disadvantageous because impurities are inputted from various paths while operation soft water passes through the paths or generated therein. These impurities can change into scales on the outer surfaces of the heat transfer tubes causing the heat exchange efficiency to be decreased. Also, when scales are deposited between the heat transfer tubes and the tube support plates become a sludge that gradually solidifies, denting occurs between the tube support plates and the heat transfer tubes that damages the heat transfer tubes. Therefore, removal of the scales and the sludge is necessary to secure the efficiency of the steam generator and the integrity of the heat transfer tubes.

However, the conventional systems installed in the nuclear power plants are cleaned by a cleaning device inserted though a hand hole in the steam generator that just removes sludge on the tube sheet, to which the heat transfer tubes are fixed.

Therefore, it is necessary to clean the plurality of tube support plates and the heat transfer tubes of the upper bundle.

SUMMARY OF THE INVENTION

Therefore, the present invention has been made in view of the above problems, and it is an object of the present invention to provide a system for cleaning the tube support plates and heat transfer tubes of a steam generator as an ascending/descending means which is vertically transferable allows for a cleaning device to move up to a position where the plurality of tube support plates and the upper bundle of heat transfer tubes are, wherein the ascending/descending means is transferably installed to a guide rail which is installed ate an upper hand hole located on one side of the steam generator, and the cleaning device is mounted on the ascending/descending means.

In accordance with the present invention, the above and other objects can be accomplished by the provision of an upper bundle cleaning system of steam generator for cleaning heat transfer tubes and tube support plates which support the heat transfer tubes and have slots. The system includes: a mounting fixture installed on an upper hand hole located at one side of the steam generator, in which the upper hand hole is located in a receiving unit; a guide rail which penetrates through the mounting fixture and is transferably installed to the mounting fixture; a transfer member installed between the mounting fixture and the guide rail, to allow the guide rail to reciprocate back and forth; an ascending/descending means pivotally installed to one side of the guide rail; a rotation member installed to the guide rail, for rotating the ascending/descending means; a supporting member installed to a lower hand hole located at one side of the steam generator, for supporting the ascending/descending means when the ascending/descending means stands vertically and operates; a cleaning device connected to the ascending/descending means, for cleaning heat transfer tubes and tube support plates as it moves up and down by the ascending/descending means, and spraying water through its nozzle; a water supplying device installed to one side of the steam generator, for repeatedly performing a water supplying operation in such a way that the water supplying device supplies water to the cleaning device, sucking and filtering the water sprayed from the cleaning device, with impurities like sludge removed from tube support plate or tubes, and then re-supplying the filtered water to the cleaning device; a site control device installed in a peripheral site of the steam generator, for controlling the transfer member, the ascending/descending means, the rotation member, the cleaning device, and the water supplying device; a remote control device located outside the receiving unit, for controlling the transfer member, the ascending/descending means, the rotation member, the cleaning device, and the water supplying device.

The cleaning device includes: a frame; at least one or more guide means installed to the frame for guiding the frame ascended/descended by the ascending/descending means and preventing vibrations when water is sprayed from the nozzle; a spray means for spraying the water supplied from the water supplying means through the nozzle; and a hinge unit installed between the frame and the spray means for allowing the spray means to perform reciprocating and rotation motions, such that the cleaning device is ascended and descended by the ascending/descending means to clean the heat transfer tubes and the tube support plates supporting the heat transfer tubes.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of a cleaning system of tube support plates and heat transfer tubes of steam generator according to the present invention will be described in detail with reference to the annexed drawings.

Figure 1:
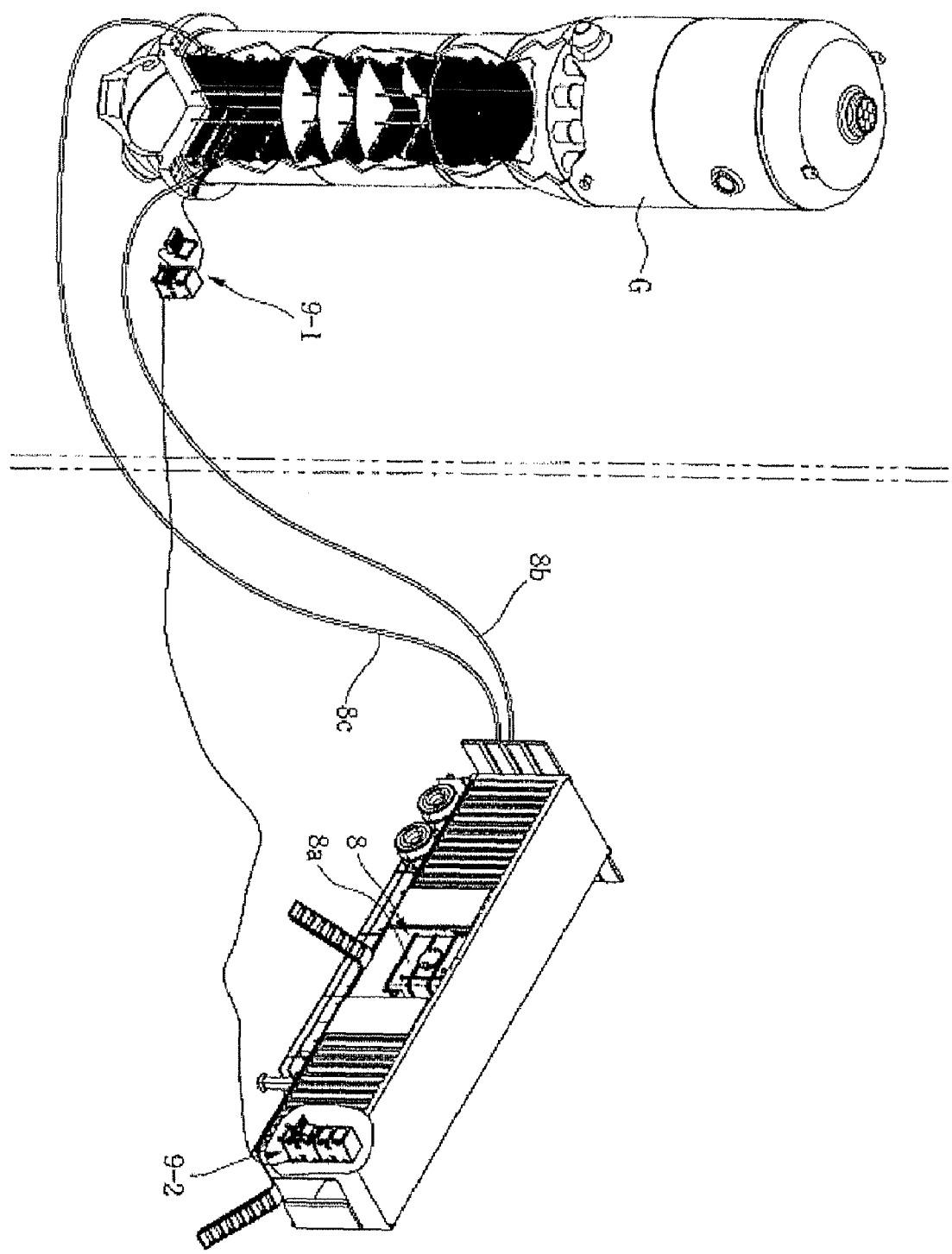
FIG. 1 is a view illustrating a state where a system for cleaning tube support plates and heat transfer tubes according to the present invention is installed to a steam generator.
Figure 2:
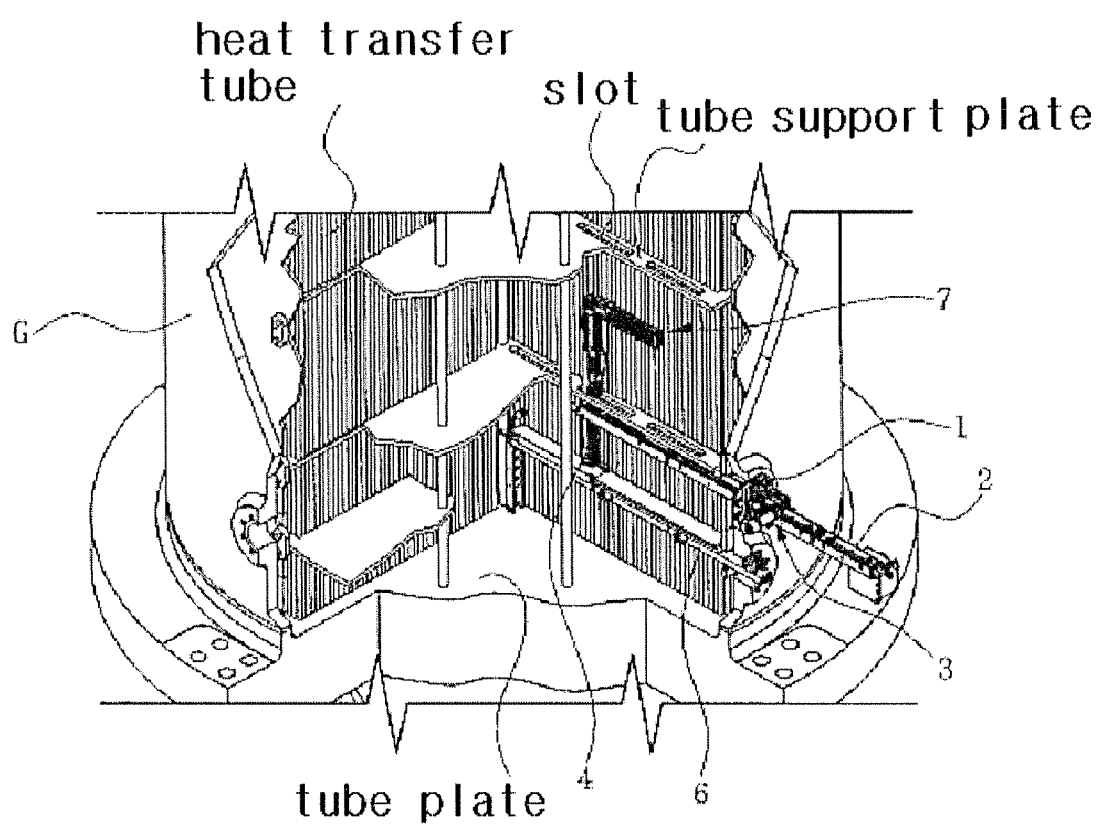
FIG. 2 is a view illustrating a primary part of FIG. 1.
Figure 3:
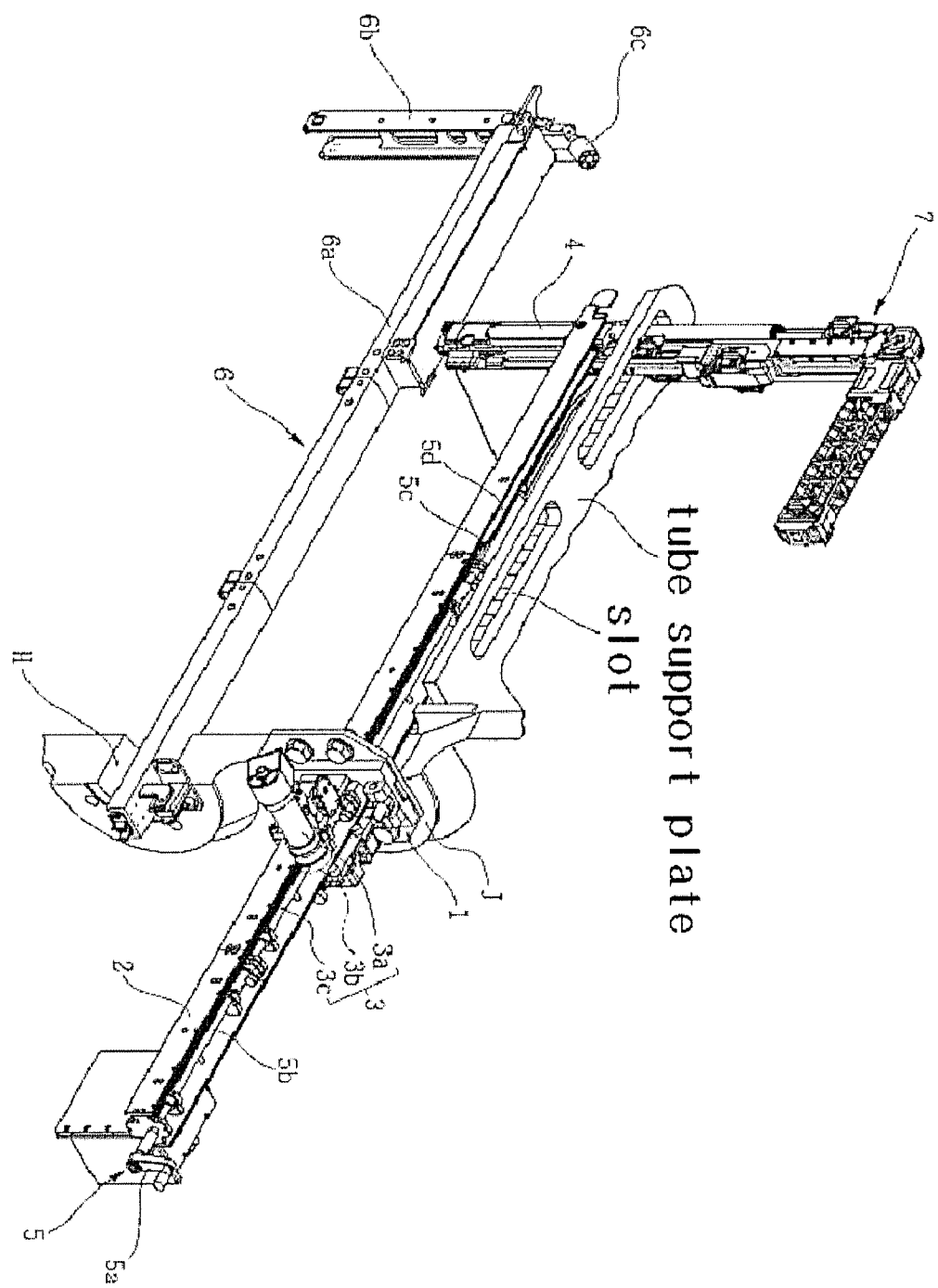
FIG. 3 is an enlarged view illustrating a part of FIG. 2.

FIG. 1 is a view illustrating a state where a system for cleaning tube support plates and heat transfer tubes according to the present invention is installed to a steam generator. FIG. 2 is a view illustrating a primary part of FIG. 1. FIG. 3 is an enlarged view illustrating a part of FIG. 2.

As shown in FIG. 1 to FIG. 3, the cleaning system is configured in such a way as to include the following elements:

A mounting fixture 1 is installed on an upper hand hole J, located at one side of the steam generator G, in which the upper hand hole J is located on a receiving unit. A guide rail 2 penetrates through the mounting fixture 1 and is installed in a transferable manner to the same. A transfer member 3 is installed between the mounting fixture 1 and the guide rail 2 to allow the guide rail 2 to reciprocate back and forth. An ascending/descending means 4 is pivotably installed to one side of the guide rail 2. A rotation member 5 is installed to the guide rail 2 and rotates the ascending/descending means 4. A supporting member 6 is installed to a lower hand hole H, located at one side of the steam generator G, and supports the ascending/descending means 4 when the ascending/descending means 4 stands vertically and operates. A cleaning device 7 is connected to the ascending/descending means 4, and cleans heat transfer tubes and tube support plates as it moves up and down by the ascending/descending means 4 and sprays water through its nozzle. A water supplying device 8 is installed to one side of the steam generator G, and repeatedly performs a water supplying operation in such a way that the water supplying device 8 supplies water to the cleaning device 7, sucks and filters the water sprayed from the cleaning device 7, and then re-supplies the filtered water to the cleaning device 7. A site control device 9-1, having a monitor and a control panel, is installed in a peripheral site of the steam generator G, and controls the transfer member 3, the ascending/descending means 4, the rotation member 5, the cleaning device 7, and the water supplying device 8. A remote control device 9-2, having a monitor and a control panel, is located outside the receiving unit, and controls the transfer member 3, the ascending/descending means 4, the rotation member 5, the cleaning device 7, and the water supplying device 8.

The transfer member 3 includes a transfer motor 3a installed to one side of the mounting fixture 1, a pinion 3b installed to the shaft of the transfer motor 3a, and a rack 3c which is installed to the guide rail 2 and is geared with the pinion 3b. The transfer member 3 moves back and forth on the guide rail 2 as the rack 3c and the pinion 3b are operated when the transfer motor 3a is driven.

Figure 4:
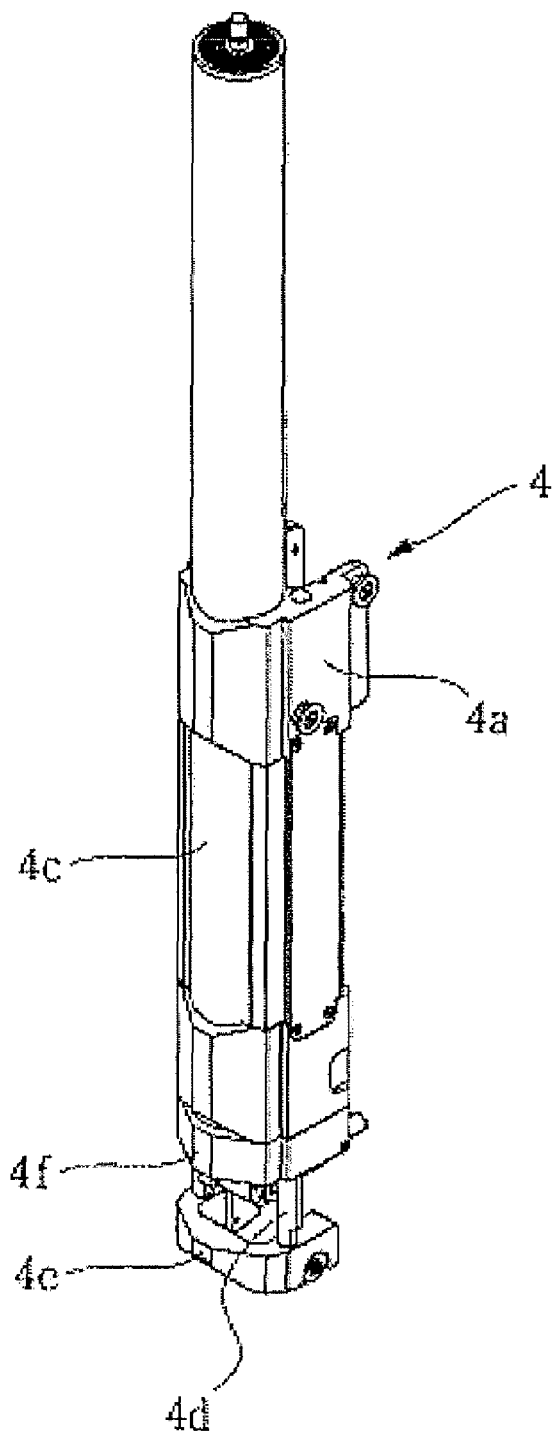
FIG. 4 is a view illustrating a cleaning device and an ascending/descending means of a system for cleaning tube support plates and heat transfer tubes of a steam generator according to the present invention.

FIG. 4 is a view illustrating a cleaning device and an ascending/descending means of a system for cleaning tube support plates and heat transfer tubes of a steam generator according to the present invention.

As shown in FIG. 4, the ascending/descending means 4 includes a base 4a pivotally installed to one side of the guide rail 2, an ascending/descending cylinder 4c which is installed to the base 4a and ascends/descends the cleaning device 7 installed onto a transfer shaft 4d, and a supporting cylinder 4f which is installed to the base 4a, and allows a supporting block 4e installed to one end of the transfer shaft 4d to be close to the supporting member 6 located at the lower portion of the guide rail 2, and to support the base 4a when the ascending/descending means 4 is operated.

The ascending/descending cylinder 4c and the supporting cylinder 4f are operated by air pressure. It is preferable that the transfer shaft 4b is manufactured in an antenna shape since the ascending/descending cylinder 4c should ascend/descend the cleaning device 7 from the bottom up to the top.

The rotation member 5 includes: a shaft 5b, which is installed in such a way that it is rotatable with respect to the lengthwise direction of the guide rail 2, has a handle 5a at its one end, and forms a screw thread (not shown) at its another end; a transfer block 5c coupled to the screw thread and reciprocates along the shaft 5b when the shaft 5b is rotated; and a bar 5d whose both ends are rotatably installed to the transfer block 5c and the base 4a of the ascending/descending means 4 to rotate the base 4a by 90° when the transfer block 5c performs a reciprocating motion.

The supporting member 6 includes: a body 6a whose one end is installed to the lower hand hole H of the steam generator G such that the body 6a is positioned at the lower portion of the guide means 2; a vertical frame 6b which is installed to other end of the body 6a and closely contact the tube plate of the steam generator G to support the body 6a; and a camera 6c which is installed to the other end of the body 6a and monitors the ascending/descending means 4 and the cleaning device 7.

The water supplying device 8 includes: a water tank 8a installed to one side of the steam generator G; a pump (not shown) which is installed to one side of the water tank 8a and pumps water stored in the water tank 8a; a first hose 8b whose one end is connected to the water tank 8a and another end which is connected to the cleaning device 7 such that it can supply water pumped by the pump to the cleaning device 7; a second hose 8c whose one end is located at the tube plate of the steam generator G and another end which is connected to the water tank 8a to suck the used water for cleaning the heat transfer tubes and tube support plates when the pump is operated; and a filter (not shown) which is installed between the second hose 8c and the water tank 8a to filter the used water which flows in through the second hose 8c.

The site control device 9-1 is installed in the peripheral site of the steam generator G and controls the transfer member 3, the ascending/descending means 4, the rotation member 5, the cleaning device 7 and the water supplying device 8. The site control device 9-1 includes a monitor and a control panel.

The remote control device 9-2 is located outside the receiving unit, and controls the transfer member 3, the ascending/descending means 4, the rotation member 5, the cleaning device 7, and the water supplying device 8. The remote control device 9-2 includes a monitor and a control panel.

The followings will omit the detailed descriptions of the mounting fixture 1, the guide rail 2, the transfer member 3, the ascending/descending means 4, the rotation member 5, the supporting member 6, the water supplying device 8, the site control device 9-1, and the remote control device 9-2, because they are well-known.

Figure 5:
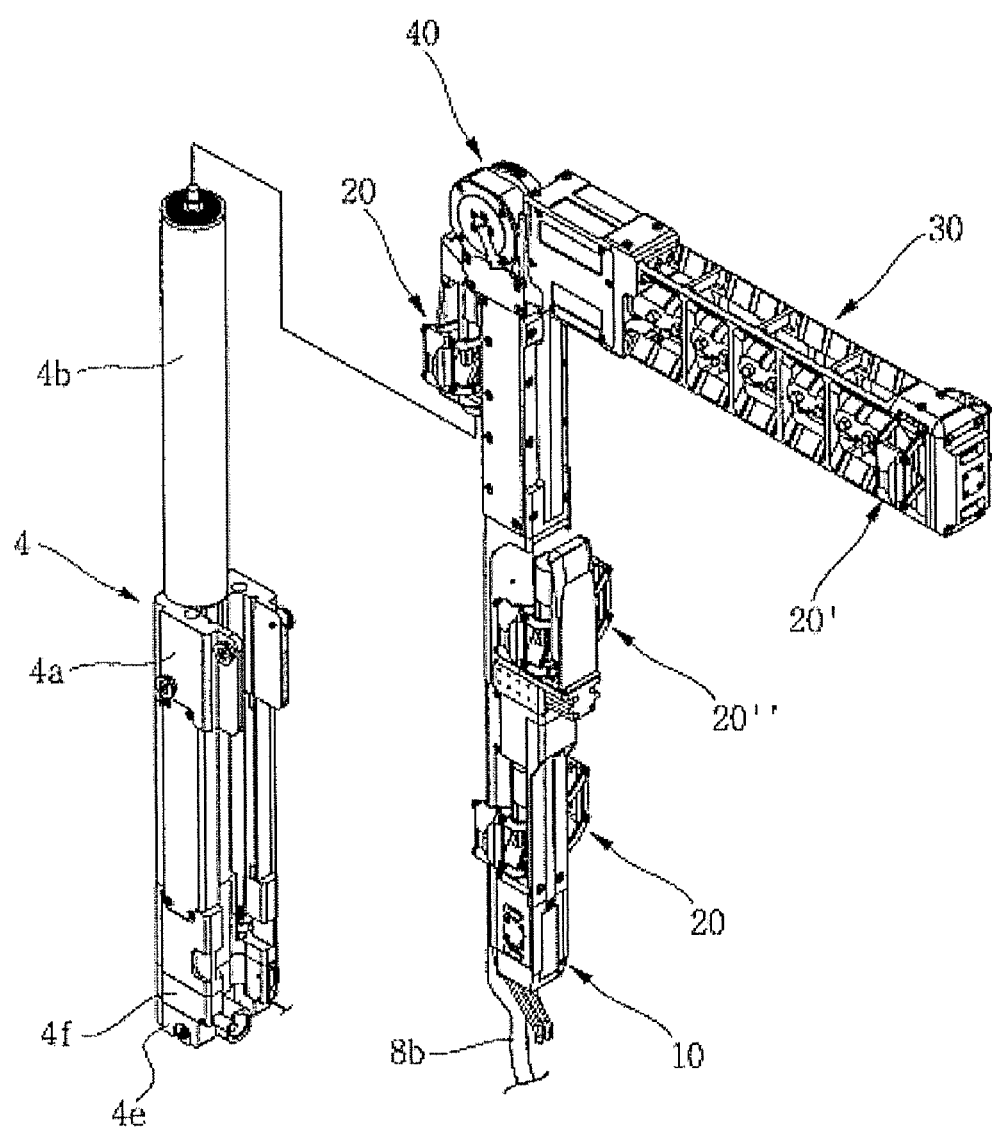
FIG. 5 is a perspective view illustrating a cleaning device of a system, for cleaning the tube support plates and heat transfer tubes of a steam generator.
Figure 6:
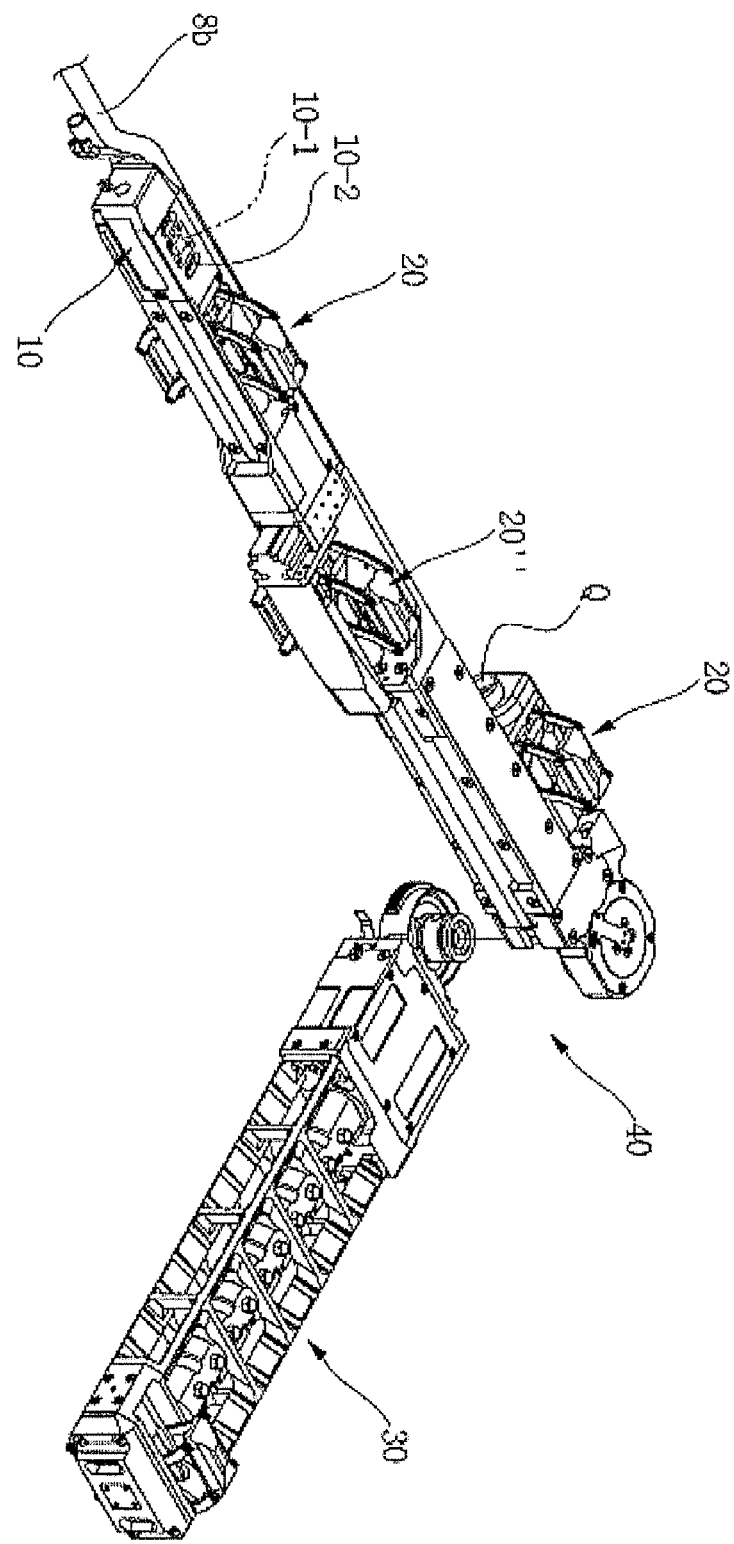
FIG. 6 is an exploded perspective view illustrating the cleaning device of FIG. 5.

FIG. 5 is a perspective view illustrating a cleaning device of a system for cleaning the tube support plates and heat transfer tubes of a steam generator, and FIG. 6 is an exploded perspective view illustrating the cleaning device of FIG. 5.

As shown in FIG. 5 and FIG. 6, the cleaning device 7 includes: a frame 10; at least one or more guide means 20 installed to the frame 10 for guiding the frame ascended/descended by the ascending/descending means 4, and preventing vibrations when water is sprayed from the nozzle; a spray means 30 for spraying the water supplied from the water supplying means 8 through the nozzle; and a hinge unit 40 installed between the frame 10 and the spray means 30 to allow the spray means 30 to perform reciprocating and rotating motions. The cleaning device 7 is ascended and descended by the ascending/descending means 4 to clean the heat transfer tubes and the tube support plates supporting the heat transfer tubes.

Here, the frame 10 is formed by a body of a certain length, to which parts are installed, which will be described later.

Figure 7:
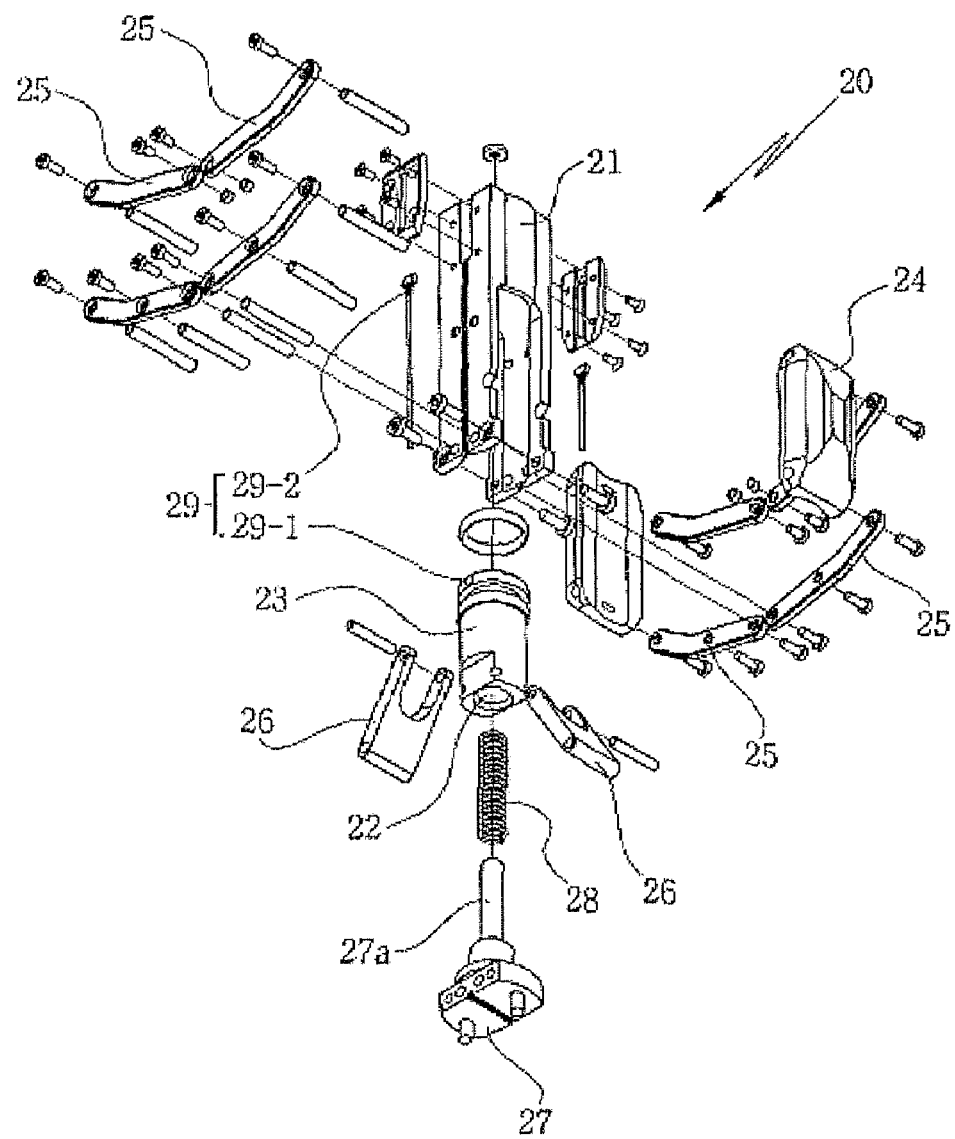
FIG. 7 is an exploded perspective view illustrating a guide means of the cleaning device according to the present invention.
Figure 8:
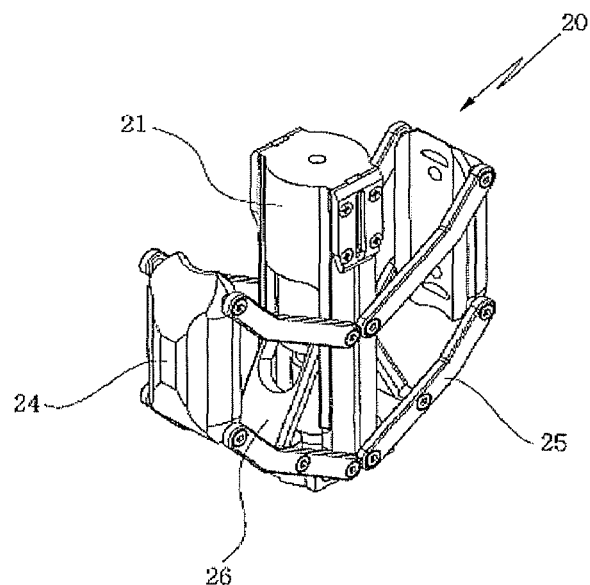
FIG. 8 is a perspective view illustrating a state where the guide means of the cleaning means is assembled.

FIG. 7 is an exploded perspective view illustrating a guide means of the cleaning device according to the present invention. FIG. 8 is a perspective view illustrating a state where the guide means of the cleaning means is assembled.

As shown in FIG. 7 and FIG. 8, the guide means 20 includes: a guide cylinder 21 installed to the frame 10; a piston 23 which is reciprocatively and transferably installed to the guide cylinder 21 and whose one side forms a groove 22; pads 24 which are installed to both sides of the guide cylinder 21 and whose outsides closely contact the heat transfer tubes to guide and support the frame 10; a plurality of first links 25 that each have one ends pivotally installed to the pads 24 and another ends pivotally installed to the guide cylinder 21 to allow the pads 24 to closely contact the heat transfer tubes; second links 26 that each have one ends pivotally coupled to the first links 25 and another ends pivotally coupled to the piston 23 to allow the pads 24 to closely contact the heat transfer tubes as the second links 26 operate in association with the first links 25 as the guide cylinder 21 is driven; a spring base 27 which is installed to one end of the guide cylinder 21 and a protrusion 27a formed on whose one side fits into the groove 22 of the piston 23; a first spring 28 which is inserted between the piston 23 and the spring base 27 and restores the piston 23 when pressure applied to the guide cylinder 21 is blocked; and, a first sensor 29 for sensing operation states of the piston.

The first sensor 29 includes a first magnet 29-1 installed to one side of the piston 23, and a first magnetic sensor 29-2 for sensing positions of the first magnet 29-1, in which the first magnetic sensor 29-2 is installed to one side of the guide cylinder 21.

Here, the guide cylinder 21 is operated, by an application program installed in the site control device 9-1 or the remote control device 9-2, in such a way that pressure applied to the guide cylinder 21 is blocked when the guide cylinder 21 reaches a slot of the tube support plate. This occurs so that the guide cylinder 21 can pass through the slot when the guide cylinder 21 is ascended by the ascending/descending means, and the pressure is applied to the guide cylinder 21 after the guide cylinder 21 passes through the slot.

Also, the guide cylinder 21 can be controlled by the site control device or the remote control device 9-2, based on a monitoring result of the guide cylinder 21, which is obtained by the camera 6c of the supporting member 6.

It is preferable that the guide means 20 is installed to the upper and lower sides of the frame 10, respectively, so that the frame 10 of the cleaning device 7 can be effectively guided or fixed.

As shown in FIG. 6, the upper guide means 20 installs a quick connector Q to its lower portion such that it can be rapidly connected and disconnected to the transfer shaft 4b of the ascending/descending cylinder 4c. The quick connector Q is operated based on an eccentric cam principle, i.e., eccentricity of two axes, and generally used. Therefore, the detailed description of the quick connector Q will be omitted.

Figure 9:
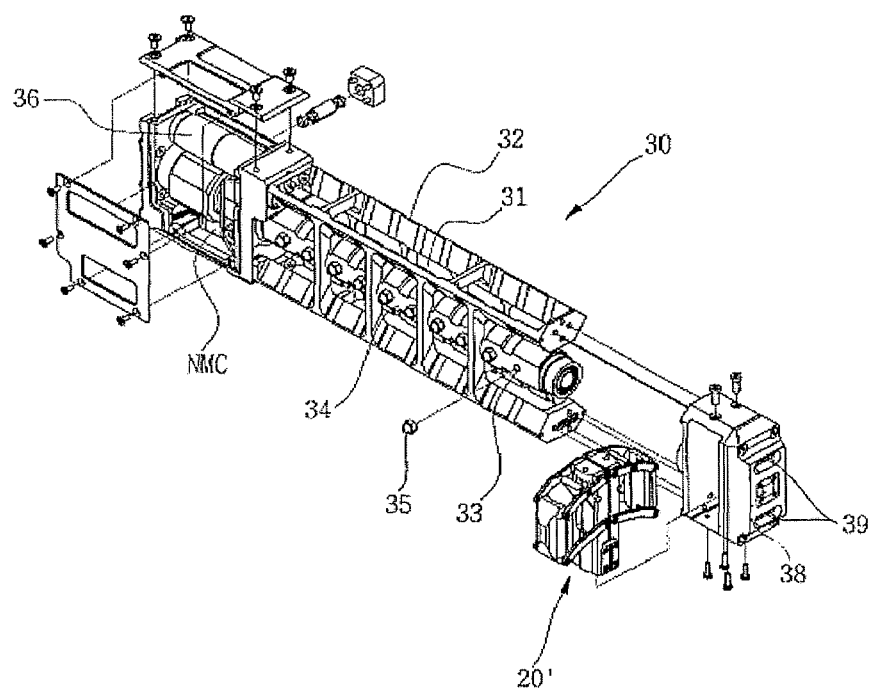
FIG. 9 is a view illustrating a spray means of the cleaning device according to the present invention.

FIG. 9 is a view illustrating a spray means of the cleaning device according to the present invention.

As shown in FIG. 9, the spray means 30 includes: a support frame 32 whose incline forms a plurality of holes 31 to spray water; a barrel 34 having a plurality of flow holes 33 which is pivotally installed to the support frame 32; a plurality of nozzles 35 which are penetratedly coupled to the plurality of flow holes 33 and aligned along the lengthwise direction of the barrel to spay water supplied from the water supplying device 8; and a first motor 36 which is installed to one side of the support frame to rotate the barrel 34 forward and reverse and to control the rotation speed of the barrel 34.

Figure 10:
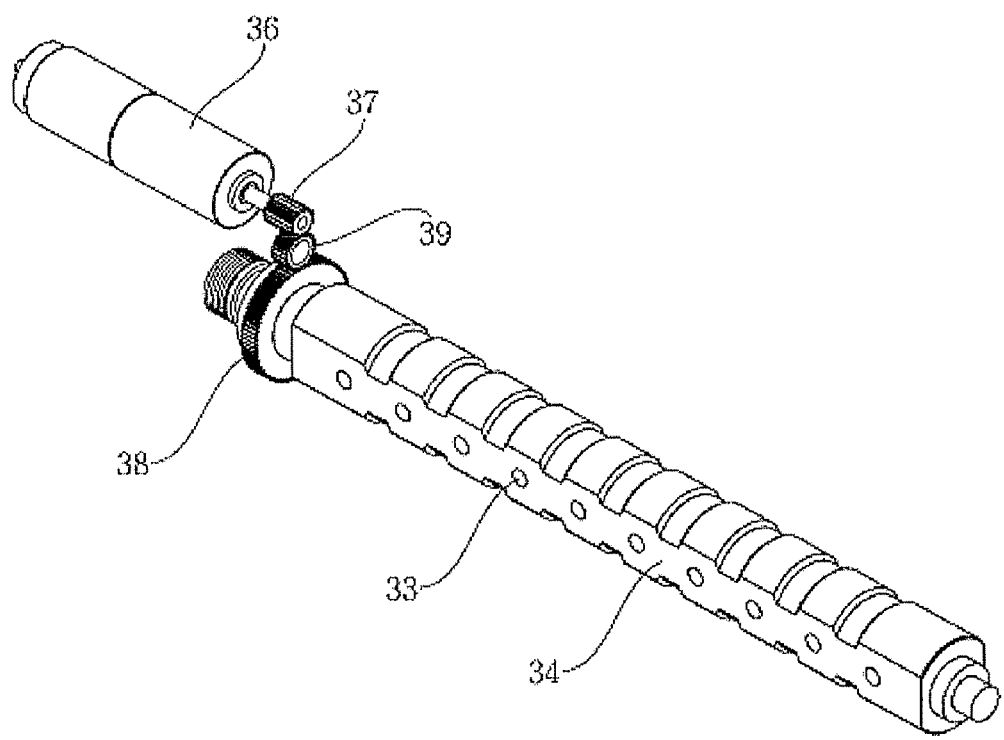
FIG. 10 is a view illustrating a state where a barrel and a first motor of the spray means of FIG. 9 are coupled to each other.

On the other hand, as shown in FIG. 10 illustrating a state where a barrel and a first motor of the spray means of FIG. 9 are coupled to each other, the first motor 36 forms a first gear 37 on its rotation shaft, and the barrel 34 forms a second gear 38 on its one side. A third gear 39 is rotatably installed to the support frame 32 and geared between the first gear 37 and the second gear 38 to transfer the motive power of the first motor 36 to the barrel 34.

It is preferable that the support frame 32 of the spray means 30 may further install a nozzle monitoring camera (NMC) at one of its sides, so as to monitor a water spaying state of the nozzles 35.

Also, it is preferable that the support frame 32 may further install a guide means 20 at its free end, so as not to vibrate when high pressure water is spayed from the nozzles 35.

The guide means 20 installed to the spray means 30 may further install a forward monitoring camera 38 and a first light emitting member 39 for emitting light at its one side. This camera should be installed in order to monitor the front when the spray means 30, in a state where the spray means 30 is perpendicular to the ascending/descending means 4, is ascended/descended by the ascending/descending means 4.

On the other hand, the frame 10 of the cleaning device 7 may further install a side monitoring camera 10-1 and a second light emitting member 10-2 at its one side, in order to monitor the side.

Figure 11:
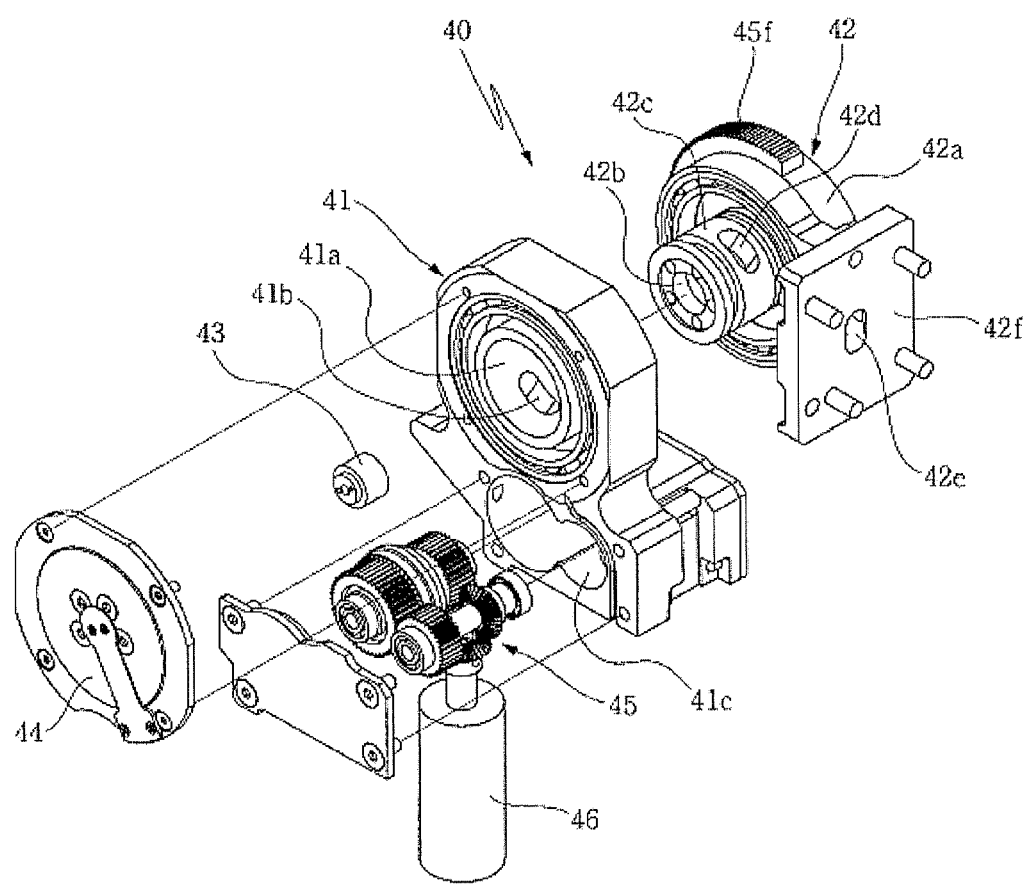
FIG. 11 is a view illustrating a hinge unit of the cleaning device according to the present invention.
Figure 12:
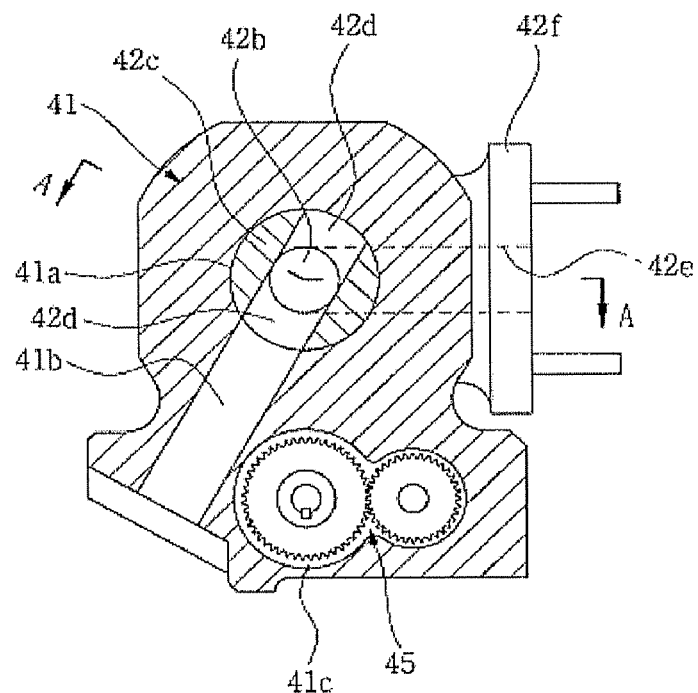
FIG. 12 is a cross-sectional view illustrating the coupling state of the hinge unit of FIG. 11.
Figure 13:
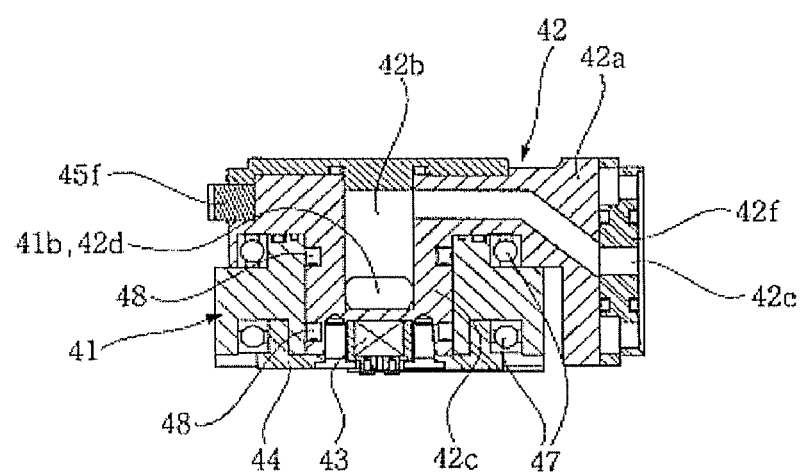
FIG. 13 is a cross-sectional view taken along lines A-A of FIG. 12.

FIG. 11 is a view illustrating a hinge unit of the cleaning device according to the present invention. FIG. 12 is a cross-sectional view illustrating a coupling state of the hinge unit of FIG. 11. FIG. 13 is a cross-sectional view taken along lines A-A of FIG. 12.

As shown in FIG. 11 to FIG. 13, the hinge unit 40 is configured in such a way as to include the following elements:

A fixed case 41 forms a gear receiving space 41c at its one side, and has a receiving hole 41a passing there through and a first flow hole 41b penetrated to the receiving hole 41a. A rotation case 42 is formed such that: a cylindrical protrusion 42c is formed at one side of a body 42a which fits into the receiving hole 41a, and has a receiving groove 42b at its one side; the protrusion 42c forms a second flow hole 42d passing there though, in which the second flow hole 42d is penetrated to the receiving groove 42b; the body 42a forms a coupling plate 42e at its outer one side, which is coupled to the spray means 30; and the coupling plate 42e forms a third flow hole 42f penetrating between the second flow hole 42d and the flow hole 33 of the spray means 30. A potentiometer 43 is installed to another side of the protrusion 42c of the rotation case 42 and checks a rotation angle of the rotation case 42. A cap 44 is installed to another side of the protrusion 42c and prevents separation of the potentiometer 43. A gear assembly 45 is installed to the receiving space 41a of the fixing case 41 and transfers motive power thereto. A second motor 46 is installed to an upper portion of the frame 10 of the cleaning device 7 and drives the gear assembly 45 to rotate the rotation case 42.

Here, the rotation case 42 is installed in such a way that it is reciprocatedly rotatable to the left and right by 180°. On the other hand, it is preferable that bearings are installed between the fixing base 41 and the rotation case 42 and between the fixing case 41 and the cap 44, such that the rotation case 42 and the cap 44 can be smoothly rotated with respect to the fixing case 41. Also, it is preferable that O-rings 48 are further installed to both circumferences of the protrusion 42c with respect to the second flow hole 42d, such that the water supplied to the spray means 30 through the flow hole 33 cannot leak.

Also, it is preferable to form at least two or more second flow hole 42d in a radial direction with respect to the receiving groove 42b of the protrusion 42c, so that the spray means 30 can spray water while the rotation case 42 rotates 180°.

Figure 14:
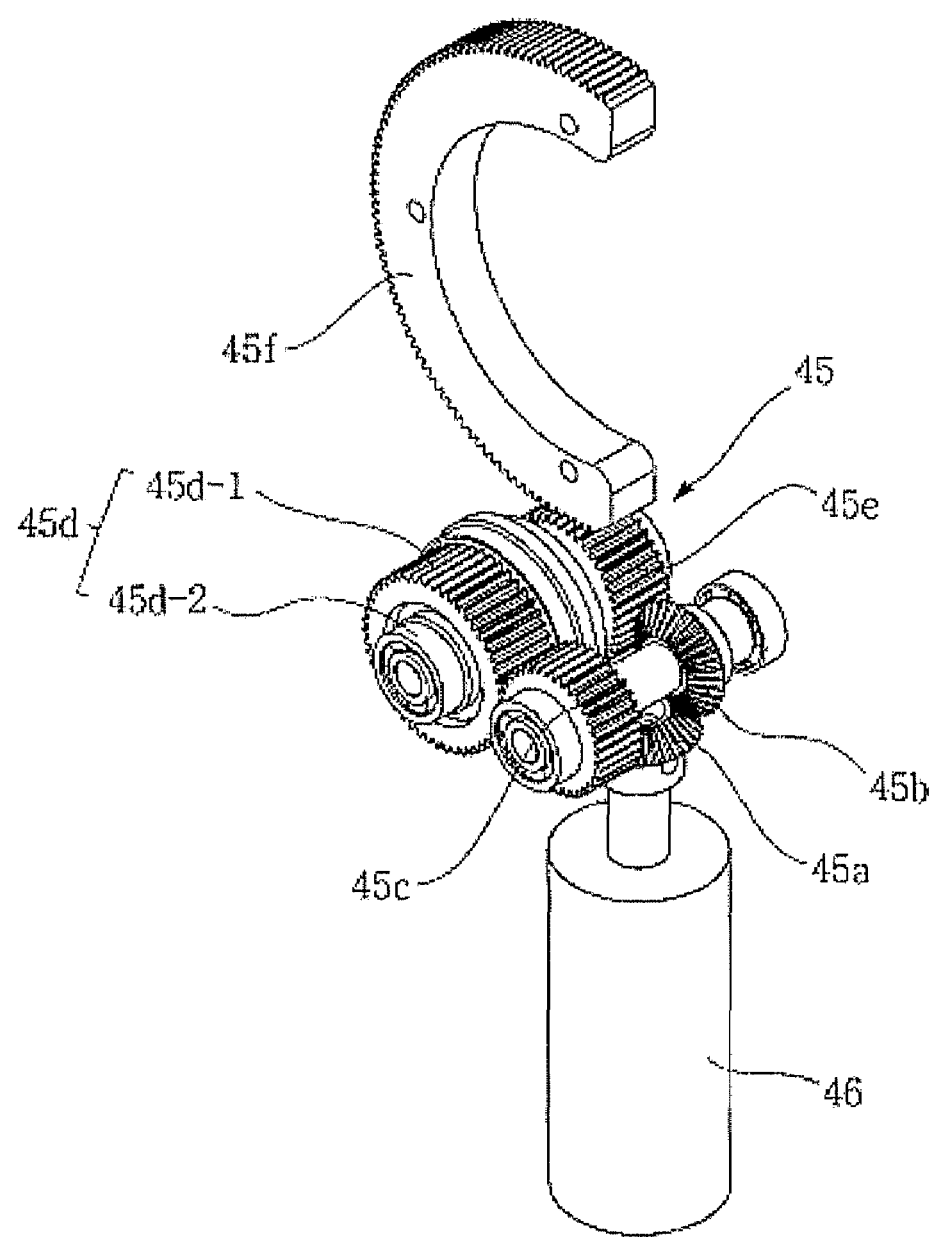
FIG. 14 is a view illustrating the gear assembly of the hinge unit.

As shown in FIG. 14 illustrating a gear assembly of the hinge unit, the gear assembly 45 is configured in such a way as to include the following elements:

A driving bevel gear 45a is installed to the shaft of the second motor 46 and located at the gear receiving space 41c. A following bevel gear 45b is installed to one side of the driving bevel gear 45a and operates in association with the driving bevel gear 45a. An idle gear 45c is installed to one side of the rotation shaft of the following bevel gear 45b. A torque limit 45d is installed to one side of the idle gear 45c and geared with the idle gear 45c, protects the gears as a body 45d-1 and a rotation shaft 45d-2 can be idled when a motive power greater than a certain amount of motive power is supplied, and allows a user to apply external pressure to the spray means 30 such that the spray means 30 can be manually rotated. A ring gear 45e is installed to the circumference of the rotation case 42. A driving gear 45f is installed to one side of the rotation shaft of the torque limit 45d and geared with the ring gear 45e, and rotates the rotation case 42 as the second motor 46 is operated.

Figure 15:
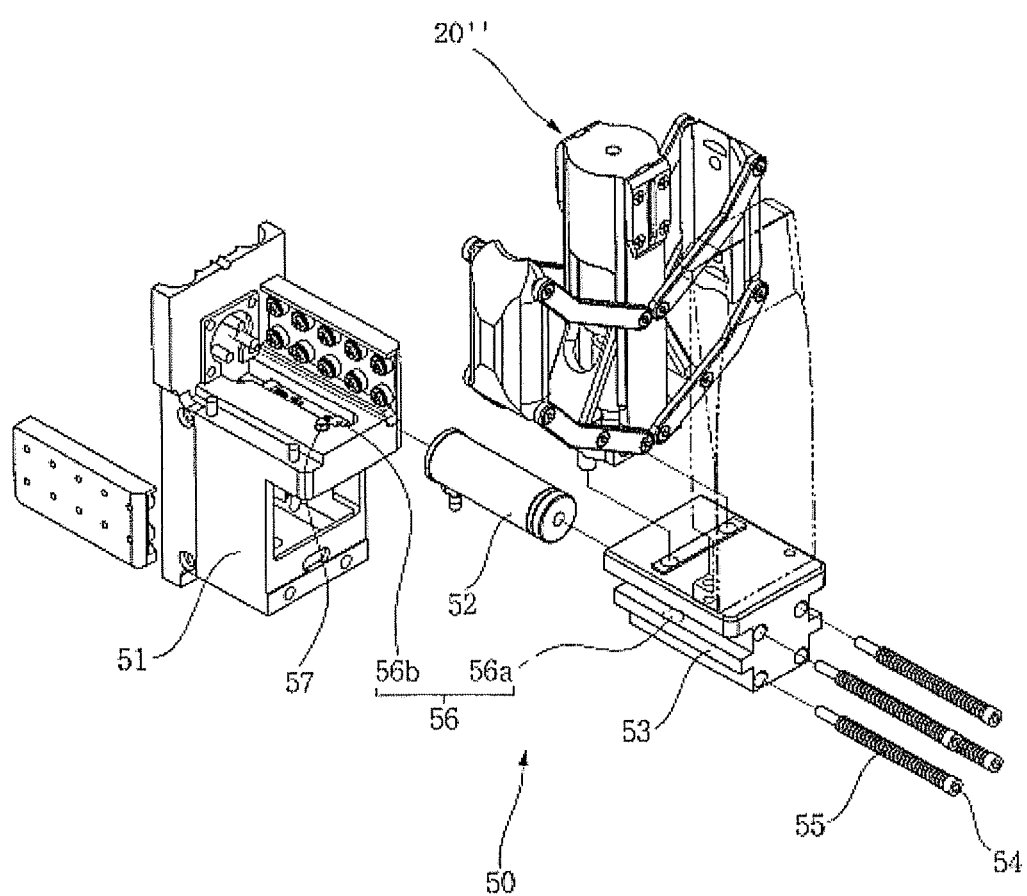
FIG. 15 is a view illustrating horizontal movement means.

On the other hand, as shown in FIG. 5, FIG. 6 and FIG. 15 illustrating a horizontal movement means, it is preferable that the frame 10 of the cleaning device 7 may include a horizontal movement means 50 which horizontally moves the guide means 20 so that the frame 10 can perform a horizontal movement. Such a horizontal movement means 50 includes: a first block 51 installed to the frame 10; a horizontal transfer cylinder 52 installed to the first block 51; a second block 53 which is horizontally-movably installed to the horizontal transfer cylinder 52 and to the upper surface of which the guide means is installed; a bolt 54 which passes through the second block 53 and couples its one end to the first block 51; a second spring 55 which is inserted by the bolt 54 and whose both ends are tangently installed between the bolt head and the second block 53 so that the spring 55 can continually push the second block 53; and a second sensor 56 for checking a transfer state of the second block.

Here, the second sensor 56 includes a second magnet 56a installed to a bottom surface of the second block 53, and a second magnetic sensor 56b which is buriedly installed on the upper surface of the first block 51 to sensor positions of the second magnet 56a.

Also, it is preferable that the first block 51 may further include a stopper 57 to uniformly limit stroke of the horizontal transfer cylinder 52.

Figure 16:
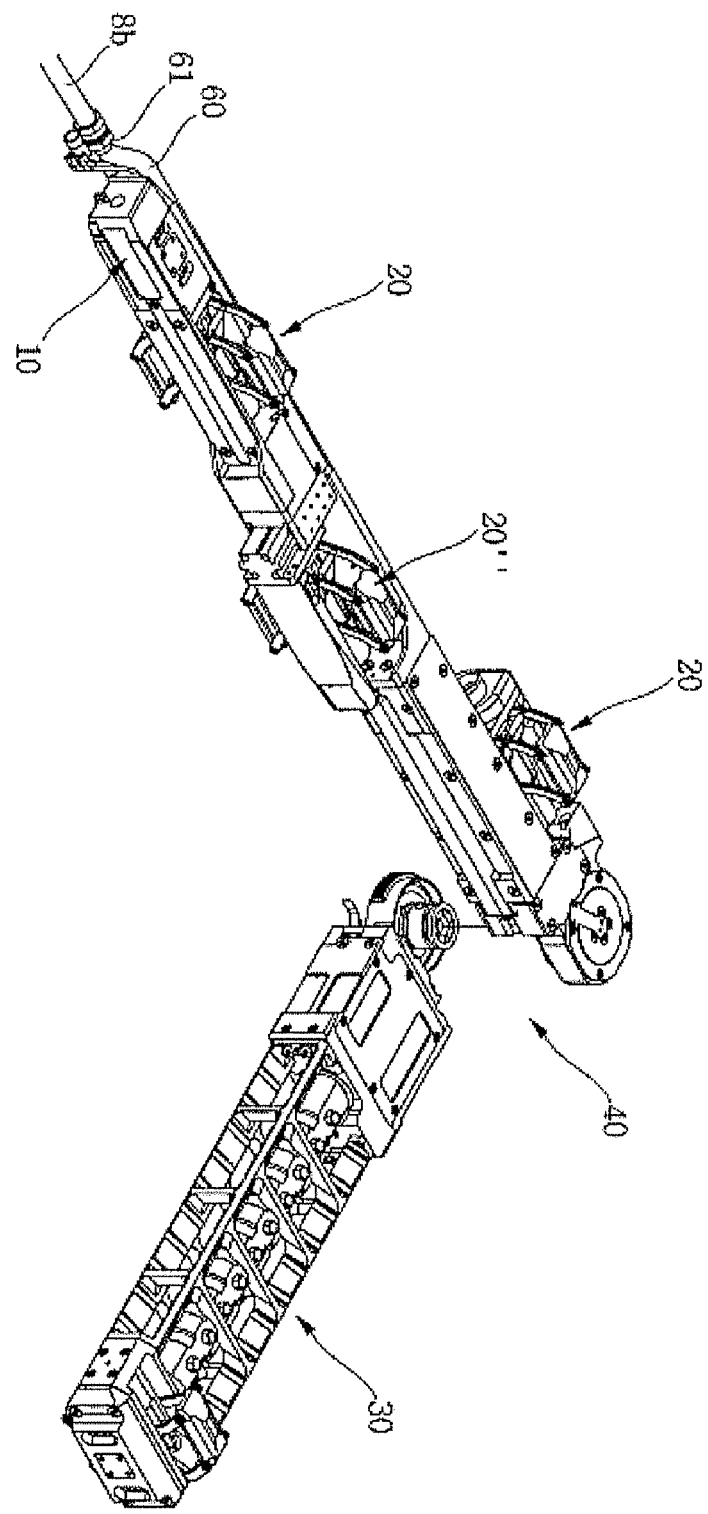
FIG. 16 is a view illustrating a state where a pipe is installed to the frame of the cleaning device according to the present invention.

FIG. 16 is a view illustrating a state where a pipe is installed to a frame of the cleaning device according to the present invention. As shown in FIG. 16, it is preferable that the frame 10 of the cleaning device 7 may further install a pipe 60 so that water supplied from the water supplying device 8 can be provided to the spray means 30. It is preferable that the pipe 60 must be implemented to endure high pressure since water is provided in a high pressure state from the water supplying device 8 to the spray means 30.

Also, the pipe 60 couples its one end to the first flow hole 41b of the fixing case 41 and its another end to the first hose 8b of the water supplying device 8.

Here, it is preferable that a coupling 61 is used to couple another end of the pipe 8 to the first hose 8b such that they can easily couple to each other.

Figure 17:
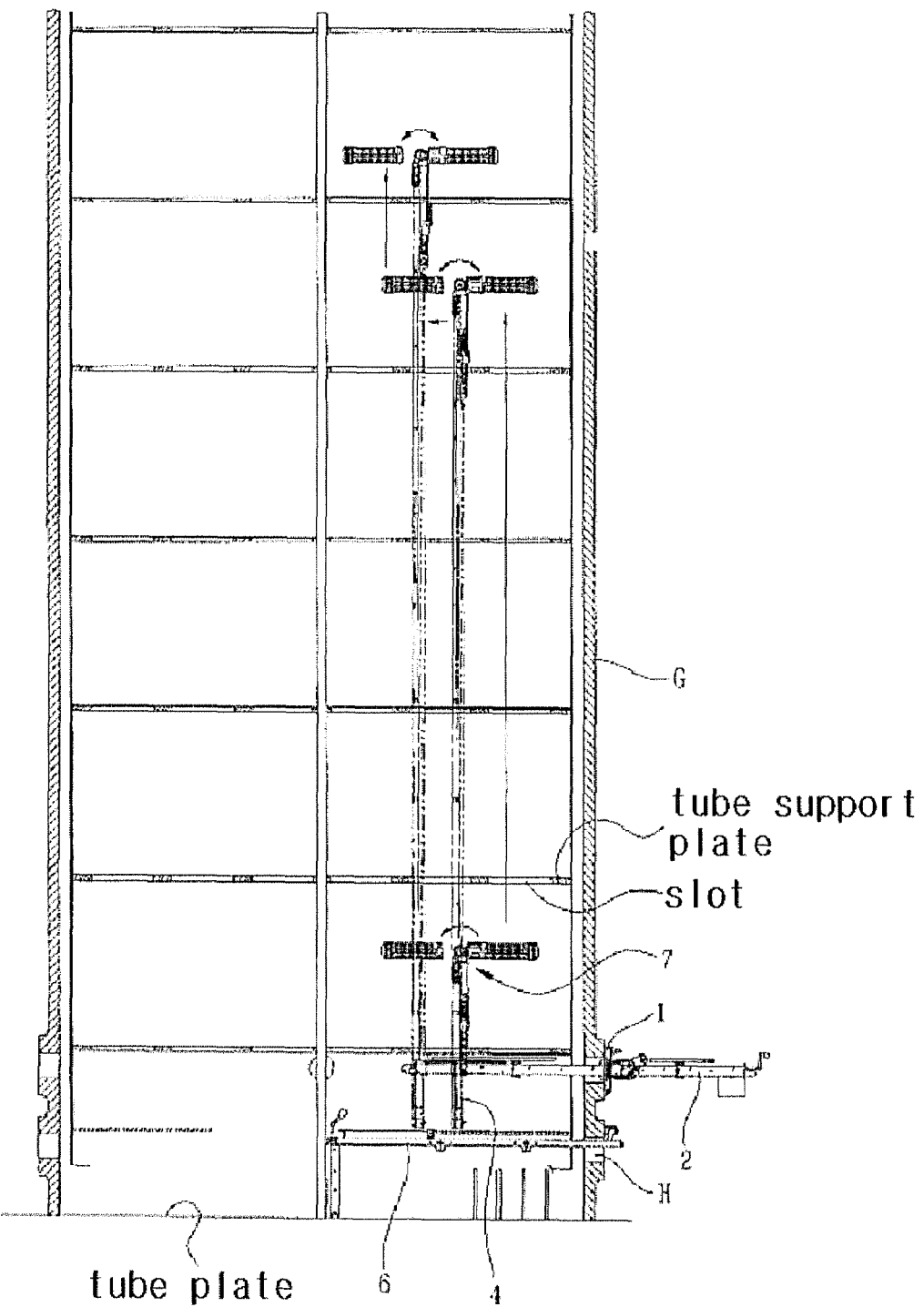
FIG. 17 is a view illustrating a use state of the system for cleaning the tube support plates and heat transfer tubes of the steam generator according to the present invention.

FIG. 17 is a view illustrating a use state of the system for cleaning the tube support plates and heat transfer tubes of the steam generator according to the present invention.

Referring to FIG. 17, the following will describe operations of the cleaning system.

In a state where the cleaning system is set to the steam generator, the transfer motor 3a of the transfer member 3 is driven to insert the guide rail 2 in the steam generator G.

Also, when the handle 5a of the rotation member 5 is rotated, the ascending/descending means 4 is vertically raised by the shaft 5b, the transfer block 5c and the bar 5d, which are operated associating with the handle 5a.

After that, the guide cylinder 21 of the guide means 20 is driven such that the pad 24 moves outwards to be located at the gap of the heat transfer tubes.

Afterwards, the ascending/descending means 4 is controlled by the site control device 9-1 or the remote control device 9-2.

The ascending/descending cylinder 4c ascends/descends the cleaning device 7 installed to the transfer shaft 4b. The gear supporting cylinder 4f transfers the support block 4e installed to the transfer shaft 4d so as to contact the supporting member 6, thereby supporting the cleaning device 7.

When the cleaning device 7 reaches a position to be cleaned, the second motor 46 of the hinge unit 40 is forwardly rotated and the gear assembly 45 transfers the motive power of the second motor 46 to the rotation case 42. Therefore, the spray means 30 coupled to the rotation case 42 rotates 90° to its one side from a position where it is perpendicular to the frame 10.

After that, the guide means 20', installed to a free end of the support frame 32 of the spray means 30, is operated such that its pad 24 can be positioned at the gap of the heat transfer tubes, thereby fixing the spray means 30 thereto.

Afterwards, the water supplying device 8 of the pump (not shown) operates to supply the pumped water to the spray means 30 through the first hose 8b.

Then the barrel 34 of the spray means 30 is rotated by the first motor 36, and the nozzles 35 of the barrel 34 spray the water to the heat transfer tubes and the tube support plates.

Here, the second hose 8c of the water supplying device 8 located at the tube plate sucks used water through its one end, and directs the sucked water to the water tank 8a in such a way that a filter (not shown), installed between the second hose 8c and the water tank 8a, filters the sucked water and transfer the filtered water to the water tank 8a.

After a certain time elapses, a user operates the site control device 9-1 or the remote control device 9-2 to stop the operation of the water supplying device 8 and the spray means 30.

When air pressure applied to the guide means 20' is blocked, the first spring 28 returns the piston 23 to its original position, such that the pad 24 associated with the piston 23 is separated from the gap of the heat transfer tubes to release the spray means 30.

When the second motor 46 is reversely rotated, the gear assembly 45 transfers the motive power of the second motor 46 to the rotation case 42. Then, as one end of the spray means 30 coupled to the rotation case 42 moves upwards, the spray means 30 rotates 180° in its opposite side.

After that, the guide means 20', installed to a free end of the support frame 32 of the spray means 30, is operated such that its pad 24 can be positioned at the gap of the heat transfer tubes, thereby fixing the spray means 30 thereto.

Afterwards, the water supplying device 8 of the pump (not shown) operates to supply the pumped water to the spray means 30 through the first hose 8b.

Then the barrel 34 of the spray means 30 is rotated by the first motor 36, and the nozzles 35 of the barrel 34 spray the water to the heat transfer tubes and the tube support plates.

Here, the second hose 8c of the water supplying device 8 located at the tube plate sucks used water through its one end, and directs the sucked water to the water tank 8a in such a way that a filter (not shown) installed between the second hose 8c and the water tank 8a filters the sucked water and transfer the filtered water to the water tank 8a.

After a certain time elapses, a user operates the site control device 9-1 or the remote control device 9-2 to stop the operation of the water supplying device 8 and the spray means 30.

When air pressure applied to the guide means 20' is blocked, the first spring 28 returns the piston 23 to its original position, such that the pad 24 associated with the piston 23 is separated from the gap of the heat transfer tubes to release the spray means 30.

When the second motor 46 is rotated forward, the gear assembly 45 transfers the motive power of the second motor 46 to the rotation case 42. Then, as one end of the spray means 30 coupled to the rotation case 42 moves upwards, the spray means 30 rotates 90° to be perpendicular to the frame of the cleaning device.

Also, the ascending/descending cylinder 4c is operated to ascend/descend the cleaning device 7 to the next cleaning position.

Here, when the cleaning device 7 approaches the slot of the tube support plate, the application program installed to the site control device 9-1 or the remote control device 9-2 operates to sequentially block the air pressure applied to the guide means 20 installed to the upper and lower parts of the frame 10, and then the pad 24 is separated from the gap of heat transfer tubes to not be caught by the slot to move inside.

After that, when the pad 24 passes through the slot, the site control device 9-1 or the remote control device 9-2 sequentially provides air pressure to the guide means 20 using the application program such that the pad 24 can be placed at the gap of the heat transfer tubes, thereby guiding the cleaning device 7.

When reaching the next cleaning position, the spray means 30 is rotated to clean the heat transfer tubes or the tube support plates. After cleaning at that position, the cleaning device 7 is ascended to another cleaning position to clean the heat transfer tubes and the tube support plates.

As such, the upper bundle of the heat transfer tubes is cleaned. Also, the heat transfer tubes and the tube support plate are cleaned while the cleaning device 7 is moved horizontally by the horizontal movement means 50.

More specifically, the following is a description for a method where the cleaning device is moved horizontally by the horizontal movement means.

Firstly, when the horizontal transfer cylinder 52 of the horizontal movement means 50 is operated in a state where the pad 24 of the guide means 20' installed to the support frame 32 is separated from the gap of the heat transfer tubes after the spray means 30 completes a water spraying, the second block 53 horizontally-movably installed to the horizontal transfer cylinder 52 moves a certain distance.

Then, a guide means 20" installed to the second block 53 is driven such that the pad 24 of the guide means 20" can contact the gap of the heat transfer tubes.

After that, air pressure applied to the guide means 20 is blocked such that the pad 24 of the guide means 20 can be separated from the gap of the heat transfer tubes.

Afterwards, the transfer motor 3a of the transfer member 3 is driven to move the guide rail a certain distance.

When the horizontal transfer cylinder 52 stops its operation, each of the guide rail 2, the ascending means 4 installed to the guide rail 2, and the frame 10 of the cleaning device 7 moves a certain distance in a state where the guide means 20" installed to the second block 53 is fixed to the cleaning device 7.

After that, the guide means 20 installed to the frame 10 is driven to place its pad 24 to the gap of the heat transfer tubes.

Afterwards, the heat transfer tubes and the tube support plates are cleaned as water is provided to the spray means 30.

So that the cleaning device 7 is moved again, air pressured applied to the guide means 20" installed to the second block 53 is blocked to separate the pad 24 of the guide means 20" from the gap of the heat transfer tubes.

After that, as the above-described procedure is repeatedly performed, the cleaning device is horizontally moved to clean the heat transfer tubes and the tube support plates.

As described above, the cleaning system according to the present invention can clean up to the upper part of the heat transfer tubes using the clean device, which is installed to the ascending/descending means movable up to the upper heat transfer tubes of the steam generator.

Also, the cleaning system can clean the upper heat transfer tubes the tube support plates in such a way that the guide means, which is installed to the frame of the cleaning device and the spray means, allows the cleaning device to be stably ascended/descended and the spray means to spray water of high pressure without vibration.

In addition, the cleaning system can clean the upper heat transfer tubes and the tube support plates in such a way that the spray means rotates 180° left and right to clean a relatively wide area, and moves left and right using the horizontal movement member.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An upper bundle cleaning system of steam generator for cleaning heat transfer tubes and tube support plates which support the heat transfer tubes and have slots, comprising:
    a mounting fixture installed on an upper hand hole located at one side of the steam generator, in which the upper hand hole is located in a receiving unit;
    a guide rail which penetrates through the mounting fixture and is transferably installed to the mounting fixture;
    a transfer member installed between the mounting fixture and the guide rail, to allow the guide rail to reciprocate back and forth;
    an ascending/descending means pivotably installed to one side of the guide rail; a rotation member installed to the guide rail, for rotating the ascending/descending means;
    a supporting member installed to a lower hand hole located at the one side of the steam generator, for supporting the ascending/descending means when the ascending/descending means stands vertically and operates;
    a cleaning device connected to the ascending/descending means, for cleaning the heat transfer tubes and the tube support plates as it moves up and down by the ascending/descending means, and spraying water through a nozzle;
    a water supplying device for repeatedly performing a water supplying operation in such a way that the water supplying device supplies water to the cleaning device, sucking and filtering the water sprayed from the cleaning device, and then re-supplying the filtered water to the cleaning device;
    a site control device installed in a peripheral site of the steam generator, for controlling the transfer member, the ascending/descending means, the rotation member, the cleaning device, and the water supplying device;
    a remote control device located outside the receiving unit, for controlling the transfer member, the ascending/descending means, the rotation member, the cleaning device, and the water supplying device,
    the cleaning device includes:
    a frame;
    at least one guide means installed to the frame for guiding the frame ascended/descended by the ascending/descending means and preventing vibrations when water is sprayed from the nozzle;
    a spray means for spraying the water supplied from the water supplying device through the nozzle; and
    a hinge unit installed between the frame and the spray means for allowing the spray means to perform reciprocating and rotation motions, such that the cleaning device is ascended and descended by the ascending/descending means to clean the heat transfer tubes and the tube support plates supporting the heat transfer tubes.

2. The system according to claim 1, wherein the hinge unit rotates 180° back and forth.

3. The system according to claim 1, wherein the guide means comprises:
    a guide cylinder installed to the frame;
    a piston which is reciprocatively and transferably installed to the guide cylinder and whose one side forms a groove;
    pads which are installed to both sides of the guide cylinder and whose outsides closely contact the heat transfer tubes to guide and support the frame;
    a plurality of first links whose one ends are pivotally installed to the pads and another ends are pivotally installed to the guide cylinder to allow the pads to closely contact the heat transfer tubes;
    second links whose one ends are pivotally coupled to the first links and another ends are pivotally coupled to the piston to allow the pads to closely contact the heat transfer tubes as the second links operate associated with the first links as the guide cylinder is driven;
    a spring base which is installed to one end of the guide cylinder and a protrusion formed on whose one side fits into the groove of the piston;
    a first spring which is inserted between the piston and the spring base and restores the piston when pressure applied to the guide cylinder is blocked; and
    a first sensor for sensing operation states of the piston.

4. The system according to claim 1, wherein the spray means includes:
    a support frame;
    a barrel having a plurality of flow holes which is pivotally installed to the support frame;
    a plurality of nozzles which are penetratedly coupled to the plurality of flow holes and aligned along the lengthwise direction of the barrel; and
    a first motor which is installed to one side of the support frame to rotate the barrel forwardly and reversely and to control the rotation speed of the barrel.

5. The system according to claim 4, wherein the support frame of the spray means further includes a nozzle monitoring camera for monitoring a water spraying state of the nozzles at its one side.

6. The system according to claim 4, wherein the support frame further includes a guide means at its free end, so as not to vibrate when high pressure water is sprayed.

7. The system according to claim 1, wherein the hinge unit includes:
- a fixed case which forms a gear receiving space at its one side, and has a receiving hole passing there through and a first flow hole penetrated to the receiving hole;
- a rotation case formed such that: a cylindrical protrusion is formed at one side of a body which fits into the receiving hole, and has a receiving groove at its one side; the protrusion forms a second flow hole passing there through, in which the second flow hole is penetrated to the receiving groove; the body forms a coupling plate at its outer one side, which is coupled to the spray means; and the coupling plate forms a third flow hole penetrating between the second flow hole and the flow hole of the spray means;
- a potentiometer which is installed to another side of the protrusion of the rotation case and checks a rotation angle of the rotation case;
- a cap which is installed to another side of the protrusion and prevents separation of the potentiometer;
- a gear assembly which is installed to the receiving space of the fixing case and transfers motive power thereto;
- a second motor which is installed to an upper portion of the frame of the cleaning device and drives the gear assembly to rotate the rotation case.

8. The system according to claim 7, wherein the gear assembly includes:
- a driving bevel gear which is installed to the shaft of the second motor and located at the gear receiving space;
- a following bevel gear which is installed to one side of the driving bevel gear and operates associating with the driving bevel gear;
- an idle gear which is installed to one side of the rotation shaft of the following bevel gear;
- a torque limit which is installed to one side of the idle gear and geared with the idle gear, and allows a body and a rotation shaft to be idled to each other when a motive power greater than a certain amount of motive power is supplied;
- a ring gear which is installed to the circumference of the rotation case;
- a driving gear which is installed to one side of the rotation shaft of the torque limit and geared with the ring gear, and rotates the rotation case as the second motor is operated.

9. The system according to claim 1, wherein the frame of the cleaning device further includes a horizontal movement means which horizontally moves the guide means such that the frame can perform a horizontal movement.

10. The system according to claim 9, wherein the horizontal movement means includes:
- a first block installed to the frame;
- a horizontal transfer cylinder installed to the first block;
- a second block which is horizontally-movably installed to the horizontal transfer cylinder and to upper surface of which the guide means is installed;
- a bolt which passes through the second block and couples its one end to the first block;
- a second spring which is inserted by the bolt and whose both ends are tangently installed between the bolt head and the second block so that the spring can continually push the second block; and
- a second sensor for checking a transfer state of the second block.

11. The system according to claim 1, wherein the frame further comprises a pipe so that water supplied from the water supplying device can be provided to the spray means.

* * * * *